March 5, 1935. E. S. CORNELL, JR 1,993,361
METHOD OF MANUFACTURING PIPE FITTINGS
Filed April 22, 1932 2 Sheets-Sheet 1
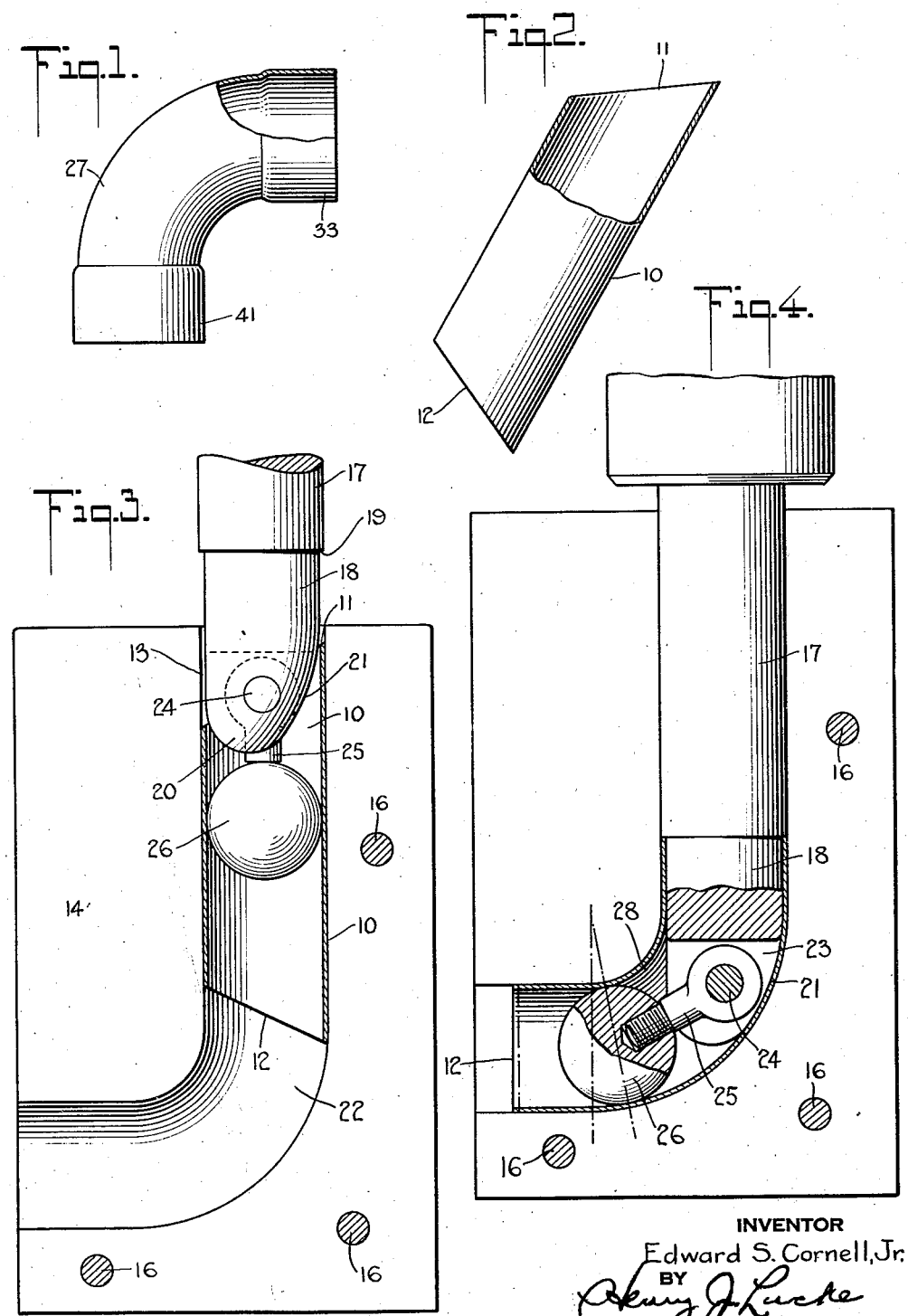
INVENTOR
Edward S. Cornell, Jr.
BY
HIS ATTORNEY March 5, 1935.    E. S. CORNELL, JR    1,993,361
METHOD OF MANUFACTURING PIPE FITTINGS
Filed April 22, 1932    2 Sheets-Sheet 2
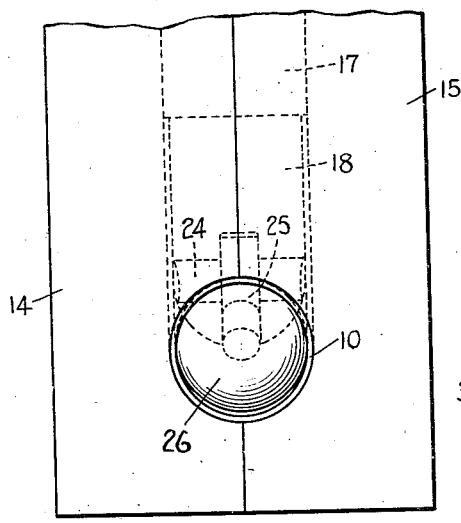
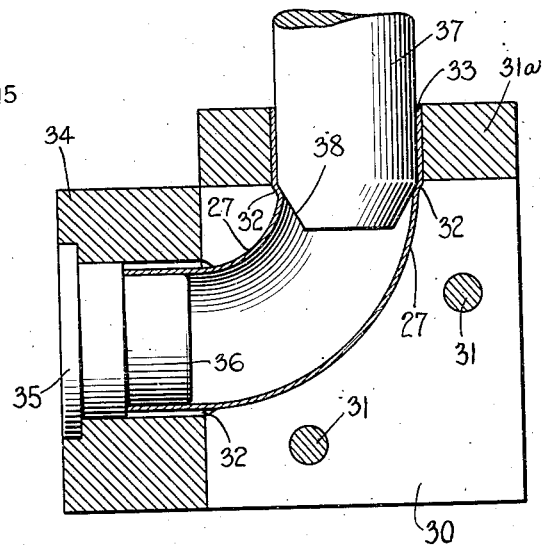
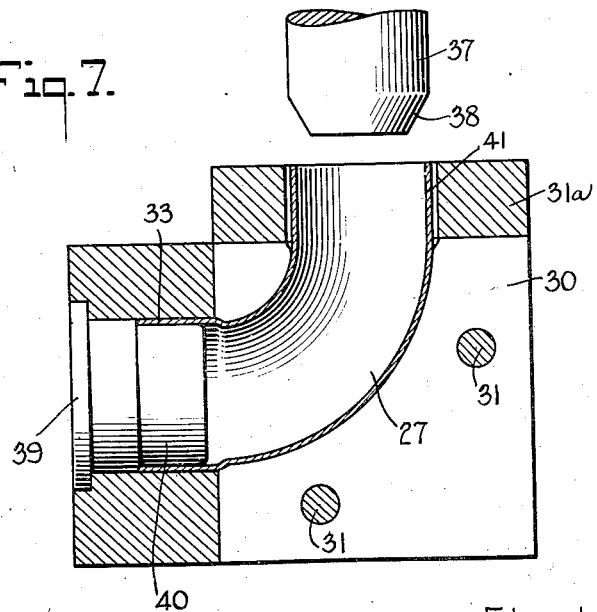
INVENTOR
Edward S. Cornell, Jr.
BY
HIS ATTORNEY Patented Mar. 5, 1935

1,993,361

UNITED STATES PATENT OFFICE 1,993,361

METHOD OF MANUFACTURING PIPE FITTINGS

Edward S. Cornell, Jr., Larchmont, N. Y., assignor to American Radiator & Standard Sanitary Corporation, New York, N. Y., a corporation of Delaware Application April 22, 1932, Serial No. 606,877

2 Claims. (Cl. 153—32)

My present invention relates to pipe fittings and more particularly to an improved method of manufacturing pipe fittings from tubes.

In the patent granted to me under #1,850,049, dated March 15th, 1932, I have described and claimed an improved pipe fitting and method of manufacturing the same from sheet copper or other suitable wrought metal and while the method therein set forth is applicable for the production of other types of pipe fittings than T's, it is desirable to manufacture other forms of pipe fittings, such for example as elbows, of seamless copper or other wrought metal material or from tubular members in which the seam is welded so as to produce a smooth exterior surface. One of the most important pipe fittings is an elbow and my present method of manufacture enables me to produce a smooth surfaced elbow from tubular material either welded or seamless and at a minimum of cost. It has heretofore been proposed to manufacture such form of pipe fitting, that is an elbow, from tubular material, but such methods have not been satisfactory and the resulting product has not been adapted to such a wide range of use as the article produced by my present improved method. By my present improved method I am enabled to dispense with any manufacturing operations subsequent to the actual forming of the elbow and am able to produce an elbow in which both the exterior and interior surfaces are smooth, this being particularly important as regards the interior of the fittings as such smoothness enables a maximum flow to be attained in the passage of fluid therethrough. In carrying out my invention I preform the ends of a length of a tubular member and place such tubular member in predetermined position within a die and afterwards force the tubular member downward into the die so as to have the tubular member assume the curved shape necessary in an elbow either 45°, 90° or any other angular dimension required. The ends of the tubular member are so preformed that when the tubular member is forced into its ultimate position within the die the ends of the resulting elbow are perpendicular to the axis of the respective straight ends of the elbow, it being assumed that each end of the elbow will have a straight portion merging into the curved portion intermediate such ends.

The object of my invention therefore is an improved method of manufacturing elbows from tubular material.

In the accompanying drawings illustrating the preferred steps of my invention and the article produced thereby.

Fig. 1 is a plan view partly in section of a finished elbow;

Fig. 2 is a plan view of a length of tube with the ends thereof preformed, such view being partially in cross-section;

Fig. 3 is a plan view of one-half of the forming die with a length of tubular material in section therein and with the punch in position preparatory to forcing the tubular member into its ultimate position within the die structure;

Fig. 4 is a view similar to Fig. 3 and showing the elbow in cross-section and in its ultimate position within the die structure and before the punch member is withdrawn therefrom;

Fig. 5 is an end elevation of the lower part of Fig. 4 assuming the other portion of the die structure to be mounted thereon;

Fig. 6 is a vertical sectional view of a die section and accompanying punch and showing an elbow in section therein, such punch having expanded one of the straight ends of the elbow to fit over a length of pipe; and Fig. 7 is a view similar to Fig. 6 but showing the elbow preparatory to expanding the other end thereof.

In practicing my invention, I take a piece of tube 10 of any desired diameter and length and preform the ends 11 and 12 by beveling the same off as shown at the desired angle, such angle being determined by the type of elbow to be formed. The length of tube 10 is then placed within the straight bore 13 of a die structure 14 but one-half of which is shown in Figs. 3 and 4, although both portions 14 and 15 are shown in Fig. 5, it being understood that the portions 14 and 15 of the die structure are assembled in fixed relation to each other by means of the usual dowel pins 16. The die structure 14 and 15 with the length of tube 10 in the straight bore 13 thereof is positioned in a press (not shown) under a plunger 17, the lower end 18 of which is annularly reduced, see Figs. 3 and 4 in diameter to fit easily within the interior of the tube 10, the portions 17 and 18 of the plunger at the joining portions thereof forming a horizontally extending faced projection 19 which bears against the end of the tube 10, it being understood that the diameter of the portion 17 of the plunger is a free sliding fit in the bore 13 of the die structure 14, 15. The lower end of the reduced diameter portion 18 is rounded as indicated at 20, and what may be termed the rear portion thereof is curved as indicated at 21 to conform with the curvature of the upper portion of the bend 22 of the bore formed in the die members 14 and 15. The lower part of the reduced diameter portion 18 of the plunger is slotted as indicated at 23 and a pin 24 passes transversely therethrough, while on such pin 24 is pivotally mounted one end of a connecting rod 25. This connecting rod at the end remote from the pin 24 is screwed into a ball 26 of a diameter equal to, or substantially equal to, the interior bore of the tube 10 and the distance from the center of the rod 24 to the center of the ball 26 is such as to bring a diameter passing through the center of the ball slightly to the rear of the lower straight portion of the elbow 27 to be formed from the tube 10, as will be apparent from an inspection of the dot and dash lines in Fig. 4. This latter is important as it prevents the now formed elbow 27 from being withdrawn from the position shown in Fig. 4, when the plunger 17 is moved upwardly. Under such circumstances, the natural friction between the now formed elbow 27 and the bore of the die elements 14 and 15 is sufficient to hold the elbow 27 in place while any roughness or inequalities in the metal of the elbow formed when the tube 10 is forced into the position shown in Fig. 4 are ironed out by the ball 26 when the same is retracted, or moved to the right and upwards as viewed in Fig. 4.

Assuming the tube 10 to have been placed in the bore 13 in the die members 14 and 15, as shown in Fig. 3, the plunger 17 is moved downwardly so as to have the upper end 11 of the tube 10 engaged by the projection 19 and as the plunger 17 moves downwardly, the tube is also moved downwardly and the lower end follows the contour of the bore formed in the die members 14 and 15. When the plunger 17 is in its lowermost position, the rounded back portion 21 at the lower end of the reduced diameter member 18 is in the position shown in Fig. 4 and serves to form the outer or larger diameter of the elbow 27. Also, it will be noted that the lower end 12 of the tube 10 is perpendicular to the axis of the straight or lower portion of such elbow and the same is true of the upper end 11 with respect to the upper straight portion of such elbow. In forcing the tube 10 into the position shown in Fig. 4 from that shown in Fig. 3, the curved portion and particularly the curved portion indicated by the reference numeral 28 becomes slightly distorted and the ball 26 engaging with the curved portion and particularly the curved portion indicated at the reference numeral 28 irons out any distortion that may have been formed in the tube 10 with the result that a smooth even bore and a smooth exterior is formed on the resulting elbow 27.

The die sections 14 and 15 are then separated from each other and the finished elbow member 27 removed therefrom. Such elbow 27 is finished in all respects except for the enlarging of the straight end portions which in some forms of elbow are necessary. In forming such enlarged ends die members 30 are utilized in conjunction with corresponding elements which fit thereon but which are not shown in order that the drawings may be as clear as possible. In any event, dowel pins 31 are utilized to hold the die sections in fixed relation with respect to each other. Such die sections have formed therein a bore which fits the curved portion of the elbow 27 and at the entrance end of such bore, there is formed a counterbore or chamber 32. Over the upper end of the die structure 30 is placed a plate 31a having a hole in alignment with the bore of the die members and the diameter of the such bore is equal to the external diameter of the enlarged end portion 33 of the elbow 27. On the adjacent side of the resulting die structure formed by the member 30 and associated member (not shown) is placed a plate 34, which has a bore also in alignment with the bore in the die members and in such bore which comprises a plurality of steps is placed a plug 35 having a step 36 thereon of a diameter equal to the internal diameter of the elbow 27. The plug 35 acts as a stop to prevent outward movement of the elbow 27 in the die member 30 and corresponding member. The assembly just described is placed in a press and a plunger 37, having a tapered end 38, is forced into the end 33 of the elbow 27 expanding the same to fit the bore in the plate 31a and resulting in the formation of the enlarged end 33. To form the other enlarged end for the elbow 27, the plug 35 is removed from the plate 34 and another plug 39 substituted therefor, this plug having a step 40 thereon having a diameter equal to the internal diameter of the enlarged end 33 in the elbow 27. This brings the other end of the elbow 27 into position within the bore of the plate 31a whereupon the plunger 37 moves downwardly enlarging the end 41 of the elbow and making a completely finished product with enlarged ends as shown in Fig. 1.

The enlarged ends 33 and 41 are desirable in certain types of elbows but are not essential and are not formed preferably on all types or sizes of elbows and therefore may be dispensed with. The invention is complete without the steps of forming the enlarged ends 33 and 41 the crux of the invention consisting in so forming the tube 10 that when the tube is formed into an elbow in the die members 14 and 15, the ends of the resulting elbow will be in finished form and therefore subsequent operations to square up the ends are entirely dispensed with and further the utilization of means such as a ball 26 pivotally mounted on the end of a plunger and used in the forming of the elbow and the subsequent ironing out or smoothing of any distortion that may occur in the formation of the elbow is within the limits of my invention.

From the above, and as illustrated in Fig. 3, the locating of the length of beveled edged tube 10 in the bore of the die to position the side of greater length of the tube within the bore on the side of the greater diameter of the bore, the differential of the material required for the excess length of the resulting elbow about such greater diameter as compared with the material along the shorter diameter of the elbow, being compensated by the greater length at the stated one side of the tube.

As appears from Fig. 3, in view of the foregoing, the ball 26, being positioned at a predetermined substantially fixed spacing longitudinally and arcuately by reason of its pivotal connection to the lower end of the plunger, remains substantially fixed relative to the tube during the stage of the downward movement of the plunger. Moreover, as is shown in Fig. 4, the effective portion of the periphery of the ball 26 at the end of the stage of the downward movement of the plunger engages the inner wall of the resulting elbow at the zone of the posterior terminus of the bend of the elbow. Upon the withdrawal, that is the upward movement, of the plunger and therewith of the ball 26, the ball 26 engages with the inner bore of the wall of the elbow completely from step to step with substantially all areas of the inner bore of the bend of the tube; thus effecting a substantially complete ironing-out of the material in the event of the departure of the material from the desired inner bore of the elbow.

I claim:

1. The method of forming an elbow which comprises positioning a length of a straight tube of wrought metal in a forming die having a bore substantially corresponding to the outer contour of the desired elbow, applying pressure to the exposed edge of the tube by means of a plunger having attached to its effective end a ball disposed pivotally at a subtantially fixed spacing from the effective end of the plunger until the desired bend of the tube has been effected, and then withdrawing the plunger and therewith the ball relative to the formed elbow, whereby a substantially uniform internal bore about the bend of the tube is insured, any departures of the metal from such desired uniform inner bore being effaced by the ball during its stated period of withdrawal.

2. The method of forming an elbow which comprises positioning a length of a bevel edge straight tube of wrought metal in a forming die having a bore substantially corresponding to the outer contour of the desired elbow, applying pressure to the exposed bevel edge of the tube by means of a plunger having attached to its effective end a ball disposed pivotally at a substantially fixed spacing from the effective end of the plunger until the desired bend of the tube has been effected, and then withdrawing the plunger and therewith the ball relative to the formed elbow, whereby a substantially uniform internal bore about the bend of the tube is insured, any departures of the metal from such desired uniform inner bore being effaced by the ball during its stated period of withdrawal.

EDWARD S. CORNELL, Jr.